United States Patent Office

3,259,455
Patented July 5, 1966

---

3,259,455
PROCESS FOR RECOVERY OF V-VALUES FROM FERROPHOSPHORUS
Ernest L. Koerner, Bridgeton, Thomas L. Hurst, Kirkwood, and Elerington Saunders, Clayton, Mo., assignors to Monsanto Company, a corporation of Delaware
No Drawing. Filed May 9, 1962, Ser. No. 193,629
9 Claims. (Cl. 23—15)

This invention relates to methods of recovering vanadium values and more particularly to methods of recovering vanadium values from raw materials containing the same in an unoxidized form, an illustration of such material being the ferrophosphorus produced in some localities as a by-product of elemental phosphorus production.

Elemental phosphorus is commercially produced on a relatively large scale from phosphate rock in a number of western states including the States of Idaho, Montana, Wyoming and Utah, and it is well known that the phosphate rock from such areas contains substantial quantities of metal values including vanadium, chromium and iron. In the electric furnace process for producing elemental phosphorus from this raw material metals of the above type become concentrated in the ferrophosphorus by-product, and the ferrophosphorus usually contains from about 3 to 10% vanadium, 20 to 30% phosphorus, 3 to 6% chromium and 50 to 60% iron. The specific form of the vanadium in ferrophosphorus is not known with certainty but the vanadium is believed to be largely present as elemental vanadium, vanadium phosphides, iron-vanadium compounds, or as mixtures of these. When present in elemental form the vanadium may be present as a solid solution in iron, or in other words as an alloy. Regardless of its physical form, however, the vanadium is present in a form essentially free of chemically combined oxygen.

Numerous efforts have been made to recover vanadium from ferrophosphorus but as yet no completely satisfactory process has been developed. This is because previous efforts to oxidize the vanadium and recover the same in the form of vanadium oxides have resulted in processes not suitable for commercial practice because of the prohibitive expense involved or else have resulted in processes which produce a product containing objectionable quantities of phosphorus or other contaminants.

It is a primary object of this invention to provide an economical process for recovering vanadium in an acceptably pure form from raw materials containing vanadium in a chemically reduced state and in particular from ferrophosphorus derived from western phosphate rock.

It is another object of the invention to provide a low temperature process for the recovery of vanadium from ferrophosphorus, which process does not require melting of the solidified ferrophosphorus raw material in order to effect a high percentage recovery of the vanadium values.

These as well as other objects of the invention are accomplished by a process which comprises heating ferrophosphorus containing vanadium in the presence of oxygen and an alkali metal halide. Under proper conditions this results in the vanadium in the ferrophosphorus being almost quantitatively transformed into water soluble vanadium compounds which thereafter can be recovered by extracting them from the oxidized ferrophosphorus material with an aqueous solvent.

All of the chemical reactions that occur in a process in accordance with this invention are not fully understood nor is it fully understood just why an alkali metal halide facilitates the oxidation of the elemental vanadium and/or vanadium compounds in ferrophosphorus or the like so that they are transformed into water-soluble compounds. It has been found, however, that the addition of an alkali metal halide to the ferrophosphorus or the like makes it possible to effect oxidation of the elemental vanadium or vanadium compounds in the ferrophosphorus in a relatively short time and at temperatures well below the melting point of ferrophosphorus, whereas the use of pure ferrophosphorus requires either a prolonged reaction period or temperatures well above the melting temperature of the ferrophosphorus. It is also an advantage of the invention that the alkali metal halide results in the selective solubilization of the vanadium in preference to other metals in the ferrophosphorus such as chromium so that involved purification procedures for removing chromium and other metal contaminants from the vanadium are not normally required. It is a further advantage of the invention that the vanadium can be recovered relatively free of phosphorus since for most end uses of vanadium and vanadium compounds only a small amount of phosphorus can be tolerated.

Any raw material containing substantial quantities of vanadium values in unoxidized form, for example as elemental vanadium, vanadium phosphides and/or iron-vanadium compounds, can be employed in a process of this invention although, based upon economic considerations, the raw material should contain at least about 1% and preferably at least about 5 to 8% vanadium. Ferrophosphorus derived from any of the western phosphate rock formations presently used in the commercial manufacture of phosphorus is generally satisfactory. Further examples of suitable materials include vanadium alloy scrap and ferrovanadium. The raw material should be in particulate form with a particle size as small as is conveniently obtainable. To insure satisfactory results the material to be processed should generally have a particle size smaller than about 14 mesh (U.S. Sieve Series), and for best results a majority of the material should have a particle size within the range of about 200 to 400 mesh. In most instances it is necessary to grind the raw material and for this purpose any conventional grinding equipment can be employed. Excellent results have been obtained in most instances by first passing the ferrophosphorus or the like to be processed through a conventional jaw crusher and thereafter further reducing its particle size by means of a ball milling operation.

Any of the commercially available alkali metal halides can be employed in accordance with this invention and suitable examples of operative materials include sodium chloride, potassium chloride, and sodium bromide. As a practical matter, however, one's choice for commercial operations is presently limited, because of cost considerations, to chlorides and in particular to sodium and potassium chlorides. Sodium chloride is greatly preferred. The alkali metal halide can be of any particle size although it should be sufficiently subdivided that reasonably uniform mixture with the ferrophosphorus or the like can be obtained. In other words, at least about 50% and preferably at least about 90% of the salt should be smaller than 6 mesh and preferably smaller than 9 mesh. Excellent results can be obtained with commercially available rock salt.

Any suitable equipment can be used for mixing salt with the vanadium containing raw material and, for example, one can employ a ribbon blender or any other type of commercially available apparatus. As implied above, the salt appears to perform two separate and distinct functions. First, the salt accelerates the oxidation of metallic phosphides and elemental metals present in the ferrophosphorus or the like and, secondly, it provides sodium so that the phosphorus and vanadium in the oxidized material are transformed into sodium compounds. The chemical nature of the sodium containing compounds is not known with certainty and is unimportant in so far as the present invention is concerned. The vanadium is believed to be largely in the form of one or more vandates such as sodium metavandate, and in harmony with conventional practice the vanadium compounds in the oxidized material are referred to collectively in the specification and claims as "metavanadates." It should be emphasized, however, that the process is the same without regard to the number or specific nature of the vanadium compounds present in the oxidized material and no implication that any specific compound or that more than one compound need be present is intended.

The amount of alkali metal halide required to accomplish each of the above two purposes is not necessarily the same and, in fact, a relatively high degree of oxidation can readily be achieved with only about 10% or less of the alkali metal halide theoretically required to form alkali metal metavanadate and alkali metal metaphosphate with the vanadium and phosphorus present in the material to be processed. It is, however, seldom advantageous to use in the over-all roasting operation less than an amount of the alkali metal halide theoretically required to form alkali metal metaphosphate and metavanadate with all of the phosphorus and vanadium present during the roasting operation. There is no upper limit as to the amount of the alkali metal halide which can be employed based upon chemical considerations but the use of large excesses is uneconomical and makes material manipulation more difficult during the roasting operation. In fact, it is seldom advantageous to use more than about a 100% excess above that theoretically required although the use of some excess aids in the formation of alkali metal metavanadates. In most instances a 20 to 50% excess above theoretical is sufficient to insure the transformation of high percentages of the vanadium and phosphorus into metavanadates and metaphosphates during the roasting operation and constitutes a preferred amount of the alkali metal halide to be employed. In terms of the usual ferrophosphorus this means that one should employ from about 50 to 125% and preferably from about 60 to 100%, based on weight of the ferrophosphorus, of sodium chloride, or a chemically equivalent amount of other alkali metal halide.

Roasting of the vanadium containing raw material and alkali metal halide mixture can be conducted in any suitable type of equipment, although it has been found that better yields are obtained if the equipment is such that it results in stirring or agitation of the material being roasted. Examples of suitable equipment include the multiple hearth furnace and the rotary kiln. Slightly better yields can also sometimes be obtained if the roasting operation is conducted in stages with only a fraction of the total amount of alkali metal halide being present during the first stage. For example, it has been found that by performing the roasting operation in two stages with as little as about 1% but preferably at least about 5% to 50% of the alkali metal halide present in the first stage and with the remainder, if any, being added immediately preceding the second stage of the roasting operation, over-all yields can be increased in some instances by as much as about 5 to 10%. The material following the first stage of the roasting operation is normally quite friable so that it can be readily subdivided to a very fine state to provide intimate admixture of the vanadium containing material with the alkali metal halide.

Since one purpose of the roasting operation is to effect oxidation, oxygen must be brought into contact with the material being processed during the roasting operation. This can conveniently be done in a multiple hearth furnace by using an excess of air in the combustion gases or in a rotary kiln by passing oxygen containing gases over the mixture of ferrophosphorus or the like and alkali metal halide during its passage through the kiln. Unless the gas flow reaches levels such that excessive cooling of the material being roasted is effected, the introduction of excess oxygen over that theoretically required to transform all of the oxidizable constituents such as phosphorus, vanadium, chromium and iron in the starting material to their respective oxides such as $P_2O_5$, $V_2O_5$, $Cr_2O_3$, and $Fe_2O_3$ is highly advantageous. In other words, if one does not employ sufficient oxygen to result in substantially all of the vanadium present in the starting material being oxidized the efficiency of the process is reduced. It has been found that for a satisfactory degree of recovery of the vanadium values under most operating conditions at least about a 10% excess of oxygen above that theoretically required should be employed and there preferably is employed at least about a 50% excess. In terms of the usual ferrophosphorus this means that under most conditions one should employ at least about 0.6 to 1 pound of oxygen per pound of ferrophosphorus. Of course, if a procedure is employed such that it is inconvenient to use excess oxygen, satisfactory recoveries of the vanadium can be effected under optimized conditions using only approximately the theoretically required amount of oxygen.

If the roasting operation is conducted in the absence of water vapor, elemental halogen gas will be released by the alkali metal halide used in a process according to this invention, and since elemental halogens are difficult to recover from the off gases and for the reason that hydrogen halides can be employed in a subsequent step in a preferred embodiment of the invention, it is generally advantageous to conduct the roasting operation in the presence of sufficient water vapor to result in the formation of hydrogen halides to the substantial exclusion of free halogens. The hydrogen halides can then be readily recovered from the off gases by a simple scrubbing operation. To effect a reasonably complete transformation of the halogen into hydrogen halide an amount of water vapor should be employed which is at least equal to that theoretically required to react with the halogen liberating material and in most instances a 50 to 100% excess should be used. Expressed differently, the material being roasted can advantageously be contacted with from about 0.15 and preferably from about 0.2 to 0.3 pound of water per pound of sodium chloride, or equivalent weight of other alkali metal halide, present in the material. Part of the water vapor is normally provided as a result of combustion of the fuel. The upper limit as to the amount of water vapor that can be used is well above that which is likely to be encountered in normal operation, but if the water vapor content of the gases being passed into contact with the material being roasted becomes too high, it interferes with the oxidation which must be effected. For example, such intereference with the oxidation reaction may be encountered when the water vapor content of the gases being passed into contact with the material to be oxidized exceeds about 10 to 20% by weight.

For a satisfactory reaction rate the reactions involved in a process in accordance with this invention must usually be conducted at a temperature of at least about 200 to 300° C. and preferably at least about 400° C. Considered together, the reactions are exothermic and under average conditions the oxidation reaction becomes self-sustaining at a temperature of about 350 to 450° C., and, in fact, unless measures are taken to cool the reaction mixture, such as by increasing the rate of gas flow, the temperature may even in some instances rise higher than desired. This is not to say, however, that there is any upper operative temperature limit below the vaporization temperature of sodium metavanadate but, as previously mentioned, it is an advantage of the invention that it can be satisfactorily conducted below the melting temperature of the materials being oxidized and, in fact, even below the melting temperature of the alkali metal halide in most instances. The preferred temperature range for conducting the roasting operation is, therefore, from about 700 to 800° C.

The time required to effect a reasonably complete oxidation of the vanadium materials in the ferrophosphorus or the like depends upon a number of process variables including the amount of alkali metal halide and oxygen employed, degree of subdivision of the starting material and temperature of heating. Under normal conditions the reaction is reasonably complete in from 1 to 3 hours, but under adverse conditions a longer period of time, for example, 5 to 10 hours, may be required. Conversely, a substantial recovery of vanadium can frequently be effected under optimum conditions using shorter reaction times such as, for example, 15 to 30 minutes. It is not normally advantageous to conduct the oxidation roast for a period longer than that required to effect maximum solubilization of the vanadium values and, to the contrary, roasting the ferrophosphorus or the like for too long a period of time may result in a loss in the yield of vanadium recovered.

In many instances when the material being roasted is heated to an optimum temperature for conducting the process, the particle surfaces begin to develop a tacky nature which can result in undesirable aggregation of the material being roasted. It has been found, however, that any difficulty of this type which may be encountered can readily be alleviated by the use of a solid, inert diluent having a melting point above the maximum temperature at which the roasting operation is to be conducted. Inert diluents which have been found to be satisfactory for this purpose include quartzite and calcium silicate. Generally only 10 to 20% of the inert diluent need be employed in the reaction mixture, although a reasonable excess is not detrimental and there prefereably is employed an amount of inert diluent equal to from about 30 to 300% of the weight of the ferrophosphorus or the like. There is no operative upper limit as to the amount of the diluent that can be used but the use of very large excesses, for example above about 500% by weight, increases one's material handling costs and makes it more difficult for one to recover the desired vanadium values from the roasted mineral material. The particle size of the inert diluent is not of major importance but, within limits, it is a general rule that the finer the particle size, the more effective is the addition of a given quantity of the diluent. For best results the diluent should have a particle size smaller than about 8 mesh and preferably for the most part should have a particle size within the range of from 14 to 400 mesh. It can be added to the raw material being processed at any time prior to roasting, for example simultaneously with the alkali metal halide, using conventional equipment such as a ribbon blender.

The roasting operation, if properly conducted, results in a large percentage of the vanadium originally present in the raw material being transformed into compounds which are water soluble and which can be extracted with an aqueous solvent. It is an advantage of the process that the solubilization effected is selective and only a small percent of the chromium present in the ferrophosphorus or the like used as a starting material is solubilized. This is also true with respect to the iron and phosphorus present in the starting material. In other words, these minerals are largely present in the roasted material as $Cr_2O_3$, $Fe_2O_3$, and insoluble sodium metaphosphate, respectively, or as other relatively water insoluble compounds so that when the oxidized material is extracted with an aqueous solvent the resulting extract contains relatively small amounts of phosphorus, iron and chromium.

The oxidized ferrophosphorus or the like is normally of a friable nature and is recovered from the roasting operation in granular form if the roasting operation was conducted below the melting point of the materials being roasted. The material as recovered from the roasting operation under these conditions is in a form suitable for aqueous extraction and need not be ground or otherwise processed to place it in a more finely divided state. If the roasting operation is conducted at a temperature above the melting point of the material being processed, it can be flaked upon cooling by conventional means, such as by means of a water cooled rotating drum, or, alternatively, can be crushed and ground to place it in a form suitable for extraction. If the material is ground, care should be taken to insure that as small an amount as is possible of the ground material has a particle size less than about 10 microns because the presence of large amounts of particles of smaller diameter makes subsequent processing more difficult.

For the leaching operation there is preferably employed water in as pure a state as is conveniently available. A primary reason that the aqueous solvent should be substantially pure water is that any impurities in the aqueous solvent can contaminate the vanadium product and for most applications it is desirable to have vanadium compounds in as pure a state as possible. The amount of the aqueous solvent employed should be held to near the minimum necessary to adequately extract the alkali metal metavanadate from the roasted material. A primary reason for this is that by most procedures it is more convenient to recover soluble vanadium compounds from a relatively concentrated solution than from a dilute solution. However, to avoid possible undesirable precipitation in various components of the apparatus, the concentration of alkali metal metavanadate in the aqueous extract is advantageously held at a level which will give a calculated $V_2O_5$ content not above about 7% by weight and preferably not above about 5% by weight. It will be apparent that there is no operative upper limit as to the amount of the aqueous solvent that can be employed since if the extract is too dilute to permit satisfactory recovery of the vanadium values it can be concentrated by evaporation of excess solvent. Preferably, however, an amount of the aqueous solvent is employed which will provide without concentration a solution containing at least about 2% and preferably at least about 4% of alkali metal metavanadate calculated as $V_2O_5$.

The temperature at which the aqueous extraction of the roasted mineral material is conducted and the manipulative procedure employed are relatively unimportant. It has been found that the rate of dissolution of the vanadium values from the roasted mineral material is relatively independent of the temperature of the aqueous solvent so that one can employ almost any temperature between the freezing and the boiling temperatures of the solvent. Likewise, it is of little importance what type of extracting procedure is utilized and one can employ a slurrying and decantation technique, or, as another example, one can employ a countercurrent percolation technique. Percolation has been found to be quite satisfactory and is generally preferred.

The vanadium values can be recovered from the aqueous leach liquor by any suitable means. For example, one can acidify the leach liquor to precipitate sodium polyvanadates by well known procedures. It is an advantage of the invention, however, that the aqueous leach liquor contains the vanadium values in such pure form that vanadium pentoxide of very high purity can be produced by a modified ammonium salt precipitation procedure. In accordance with this procedure for recovering the vanadium values, the sodium metavanadate in the aqueous leach liquor is transformed into ammonium metavanadate by the addition of an excess of a water soluble ammonium salt, and while any water soluble ammonium salt can be employed, an ammonium halide salt is preferred since the halide portion of the salt can be derived from the hydrogen halide generated in the roasting operation previously described. An amount of the salt should be used such as to provide a salt concentration of at least about 3 or 4% by weight but well below the solubility limit of the salt. The solution is then warmed, if necessary, to a temperature of at least about 35° C., and preferably to a temperature between about 40° C. and 60° C., and is held at such temperature until a precipitate of ammonium metavanadate is obtained and preferably until the precipitation of ammonium metavanadate is substantially complete. This generally requires from about 30 minutes to 3 hours although in some instances a longer period, for example 24 hours, may be required. It is an advantage of the process that this precipitation of the vanadium values as ammonium metavanadate is selective and results in a further purification of the vanadium by leaving phosphates and chromates in solution. The precipitate of ammonium metavanadate can then be recovered by any suitable means, such as by filtration, washed to remove residual chlorides, and heated to drive off ammonia, thereby resulting in the formation of a vanadium oxide product which normally is composed primarily of $V_2O_5$ and which, for convenience, is hereafter referred to as $V_2O_5$.

Since the precipitation step has been found to be selective, as above described, a modified procedure in accordance with this invention to effect further purification comprises redissolving the precipitate of ammonium vanadate in aqueous solution and thereafter reprecipitating. Ammonium metavanadate is soluble in relatively pure water to the extent of about 6.5% by weight at 95° C. so that a solution of approximately 6% concentration can readily be formed without great difficulty. Precipitation from the reconstituted solution can then be effected generally as described above.

The heating operation to convert the precipitated ammonium metavanadate to vanadium pentoxide can be performed using conventional apparatus and at any suitable temperature. It is an advantage of the invention that the decomposition of the ammonium metavanadate can be effected below its melting temperature so that a rotary calciner or the like can be used for the heating operation, and preferably a temperature of from about 400° C. to 600° C. is employed. If desired, however, the ammonium metavanadate can be heated above its melting temperature to effect decomposition and for this purpose a refractory lined vessel may be employed. If temperatures above the melting point of the vanadium pentoxide product are employed, the product advantageously can be flaked by means of a water cooled chill wheel or the like.

For the most economical operation of the process the ammonia liberated in the decomposition of the metavanadate to form vanadium pentoxide is transported to a conventional scrubbing tower and employed in the collection of the hydrogen halide gases liberated during the roasting operation as previously described. This, of course, results in the formation of an ammonium halide salt which can then be used in the formation and precipitation of ammonium metavanadate from the sodium metavanadate containing leach liquor.

One embodiment of the invention will now be illustrated by the following example in which all parts are by weight unless otherwise specified.

*Example*

One thousand two hundred fifty parts of ferrophosphorus produced as a by-product of electric furnace phosphorus production from Idaho phosphate rock are ground to a particle size such that approximately 90% is smaller than 325 mesh. The ferrophosphorus contains approximately 7% vanadium (equivalent to 156 parts $V_2O_5$), 55% iron, 28% phosphorus and 5% chromium. The ground material is then mixed in a ribbon blender with 937 parts of sodium chloride (75% by weight of ferrophosphorus) and 2498 parts (200% by weight of ferrophosphorus) of quartzite fines. The sodium chloride is Utah hay and stock grade, 95% of which has a particle size between 8 and 60 mesh and the quartzite is 65% +100 mesh and 99% +325 mesh.

A mixture of ferrophosphorus, salt and inert diluent prepared as above is passed into a rotary kiln at a rate of 0.5 cubic foot per minute where it is heated to a temperature of from 750 to 775° C. by hot combustion gases entering the kiln. The average sojourn time in the kiln is approximately one and one-half hours. The kiln is fired with natural gas and the rate of gas flow (combustion gases and excess air) through the kiln is such that the exit gases contain at least about 8 to 12% oxygen. The water content of the gas entering the kiln is such that its dew point is about 100° F. The roasted material is then extracted by countercurrent percolation using demineralized water as a solvent. The amount of water is such that a 4 to 4.5% by weight, calculated as $V_2O_5$, solution of soluble vanadates results from the extraction of the oxidized ferrophosphorus. The solution is then filtered to remove insolubles.

To three thousand five hundred parts of an aqueous solution of sodium metavanadate prepared as above there is added 560 parts of a 40% by weight ammonium chloride solution, and the mixture is heated for one and one-half hours at approximately 50° C. The resulting precipitate of ammonium metavanadate is recovered by filtration, the filtrate washed to remove soluble salts, dried at 65° C., and then heated in a gas fired vessel to about 500° C. to drive off $NH_3$. The resulting residue is more than 99% $V_2O_5$. As an alternate to heating the precipitate of ammonium metavanadate as described above, it can be redissolved in water to form a 4.5% by weight, calculated as $V_2O_5$, solution. There is then added to the reconstituted solution sufficient ammonium chloride to provide a concentration of ammonium chloride of about 4.5% by weight and the resulting mixture is heated at 50° C. for one and one-half hours to precipitate ammonium metavanadate. The precipitate is then separated, washed, dried and calcined as above. This gives an additional reduction in phosphorus content.

The procedure when using other alkali metal halides or other inert diluents can be generally the same as illustrated above.

Having thus described our invention and a preferred specific embodiment thereof, what we claim and desire to secure by Letters Patent is:

1. A method of recovering vanadium from ferrophosphorus containing the same in a form essentially free of chemically combined oxygen which comprises subdividing said ferrophosphorus to produce a material having a particle size of from 14 to 400 mesh, mixing the thus divided ferrophosphorus with from 50% to 125% by weight sodium chloride, heating the mixture in the presence of an amount of oxygen at least 10% in excess of that theoretically required to result in the vanadium therein being transformed into sodium metavanadate and in the presence of sufficient water vapor to result in the chlorine released as a result of the reaction of said sodium chloride being transformed into HCl, said heating being conducted at a temperature of at least about 400° C. but below the melting point of said ferrophosphorus and in the presence of a solid inert diluent having a melting point above the maximum temperature at which said heating is conducted, said inert diluent being present in an amount from about 10% to 500% of the weight of said ferrophosphorus, cooling the resulting oxidized mixture and thereafter extracting said mixture with an amount of water such that a solution containing from about 4% to 7% by weight, calculated as $V_2O_5$, of sodium metavanadate is produced.

2. A method according to claim 1 wherein the amount of sodium chloride in said mixture is from 60% to 100% by weight of the ferrophosphorus.

3. A method according to claim 1 wherein the amount of said inert diluent is from about 30% to 300% of the weight of ferrophosphorus.

4. A method according to claim 3 wherein the particle size of said inert diluent is in the range of from 14 to 400 mesh.

5. A method according to claim 4 wherein said inert diluent is quartzite.

6. A method according to claim 4 wherein said inert diluent is calcium silicate.

7. A method according to claim 1 wherein there is dissolved in the aqueous extract containing said sodium metavanadate an amount of ammonium chloride which is less than the solubility limit thereof but which is at least about 3% by weight of said extract, the resulting solution is heated to precipitate ammonium metavanadate, the precipitated ammonium metavanadate is separated and heated to produce vanadium pentoxide and ammonia, and the thus produced ammonia is reacted with said HCl liberated during the oxidation of said ferrophosphorus to thereby produce ammonium chloride.

8. A method according to claim 7 wherein said heating of said ammonium metavanadate is conducted at a temperature of at least about 400° C.

9. A method according to claim 7 wherein said ammonium metavanadate, prior to being heated, is redissolved in water and reprecipitated.

References Cited by the Examiner

UNITED STATES PATENTS

| | | | |
|---|---|---|---|
| 831,280 | 9/1906 | Handy | 23—19.1 X |
| 1,223,567 | 4/1917 | Davis | 23—19.1 X |
| 1,255,144 | 2/1918 | Ekeley et al. | 23—19.1 X |
| 2,197,241 | 4/1940 | Hatherell | 23—19.1 X |
| 2,211,119 | 8/1940 | Hixson | 23—19.1 X |
| 2,217,665 | 10/1940 | Brown | 23—19.1 X |
| 2,357,466 | 9/1944 | Frick | 23—19.1 X |
| 3,206,276 | 9/1965 | Burwell et al. | 23—18 |
| 3,206,277 | 9/1965 | Burwell et al. | 23—18 |

OTHER REFERENCES

Hampel, "Rare Metals Handbook," Reinhold Pub. Corp., New York, 1954, pages 573–589 (pages 575, 587 and 589 of particular interest).

OSCAR R. VERTIZ, *Primary Examiner.*

MAURICE A. BRINDISI, *Examiner.*

H. T. CARTER, *Assistant Examiner.*